United States Patent
Takahashi et al.

(10) Patent No.: US 8,570,683 B2
(45) Date of Patent: Oct. 29, 2013

(54) LOW PERMEABILITY MATERIAL FOR A SIDE SHIELD IN A PERPENDICULAR MAGNETIC HEAD

(75) Inventors: Yusuke Takahashi, Odawara (JP); Hiromi Shiina, Hitachi (JP); Kazue Kudo, Odawara (JP); Yohji Maruyama, Iruma (JP); Kaori Suzuki, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 21 days.

(21) Appl. No.: 13/168,083

(22) Filed: Jun. 24, 2011

(65) Prior Publication Data

US 2012/0327531 A1    Dec. 27, 2012

(51) Int. Cl.
*G11B 5/127* (2006.01)

(52) U.S. Cl.
USPC .......................................... 360/110

(58) Field of Classification Search
USPC .................. 360/110, 234.3, 235.4, 125.4
See application file for complete search history.

(56) References Cited

U.S. PATENT DOCUMENTS

| | | | |
|---|---|---|---|
| 5,075,956 A | 12/1991 | Das | |
| 5,530,609 A * | 6/1996 | Koga et al. | 360/131 |
| 6,177,207 B1 * | 1/2001 | Koike | 428/811.5 |
| 7,295,401 B2 | 11/2007 | Jayasekara et al. | |
| 7,561,380 B2 | 7/2009 | Amin et al. | |
| 7,573,683 B1 | 8/2009 | Benakli et al. | |
| 7,649,712 B2 * | 1/2010 | Le et al. | 360/125.3 |
| 7,715,152 B2 * | 5/2010 | Okada et al. | 360/319 |
| 7,885,036 B2 * | 2/2011 | Matono et al. | 360/125.12 |
| 7,990,653 B2 * | 8/2011 | Mochizuki et al. | 360/125.09 |
| 8,064,162 B2 * | 11/2011 | Matsumoto et al. | 360/125.02 |
| 8,164,853 B2 * | 4/2012 | Hirata et al. | 360/125.3 |
| 2004/0061979 A1 * | 4/2004 | Ho et al. | 360/321 |
| 2006/0044682 A1 * | 3/2006 | Le et al. | 360/126 |
| 2006/0092575 A1 * | 5/2006 | Mochizuki et al. | 360/317 |
| 2007/0164264 A1 * | 7/2007 | Lenssen et al. | 257/1 |
| 2007/0177301 A1 | 8/2007 | Han et al. | |
| 2007/0253107 A1 * | 11/2007 | Mochizuki et al. | 360/126 |
| 2008/0068747 A1 | 3/2008 | Sasaki et al. | |
| 2008/0088972 A1 * | 4/2008 | Sasaki et al. | 360/110 |
| 2008/0112081 A1 * | 5/2008 | Matono | 360/125.08 |
| 2008/0253020 A1 * | 10/2008 | Gierak et al. | 360/110 |
| 2008/0259498 A1 | 10/2008 | Lengsfield et al. | |
| 2008/0297945 A1 | 12/2008 | Han et al. | |
| 2009/0141407 A1 | 6/2009 | Lee et al. | |
| 2009/0154012 A1 | 6/2009 | Mochizuki et al. | |

(Continued)

FOREIGN PATENT DOCUMENTS

| | | |
|---|---|---|
| JP | 2009/259365 A | 11/2009 |
| JP | 2010/061726 A | 3/2010 |
| JP | 2010/135008 A | 6/2010 |

*Primary Examiner* — Allen T Cao
(74) *Attorney, Agent, or Firm* — Zilka-Kotab, PC

(57) ABSTRACT

In one embodiment, a perpendicular magnetic head includes a main magnetic pole, a side shield disposed on both sides of the main magnetic pole in a track width direction, the side shield including a material having a saturation magnetic flux density of no greater than about 1.0 T, and a trailing shield disposed on a trailing side of the main magnetic pole, wherein the trailing shield and the side shield are physically separated from one another. In another embodiment, the side shield includes a first magnetic film, and the trailing shield includes a second magnetic film, wherein a magnetic permeability of the first magnetic film is lower than a magnetic permeability of the second magnetic film.

20 Claims, 14 Drawing Sheets

(56) References Cited

U.S. PATENT DOCUMENTS

| | | |
|---|---|---|
| 2009/0154013 A1 | 6/2009 | Sugiyama et al. |
| 2009/0168241 A1* | 7/2009 | Mochizuki et al. ...... 360/125.03 |
| 2009/0262464 A1 | 10/2009 | Gill et al. |
| 2010/0110585 A1* | 5/2010 | Takano et al. ............ 360/123.12 |
| 2010/0149697 A1* | 6/2010 | Nunokawa et al. ........... 360/319 |
| 2010/0157476 A1 | 6/2010 | Kudo et al. |
| 2010/0246054 A1* | 9/2010 | Shiroishi ........................ 360/75 |
| 2010/0315747 A1* | 12/2010 | Matsumoto et al. ....... 360/246.2 |
| 2011/0102936 A1* | 5/2011 | Sugiyama et al. .............. 360/75 |

\* cited by examiner

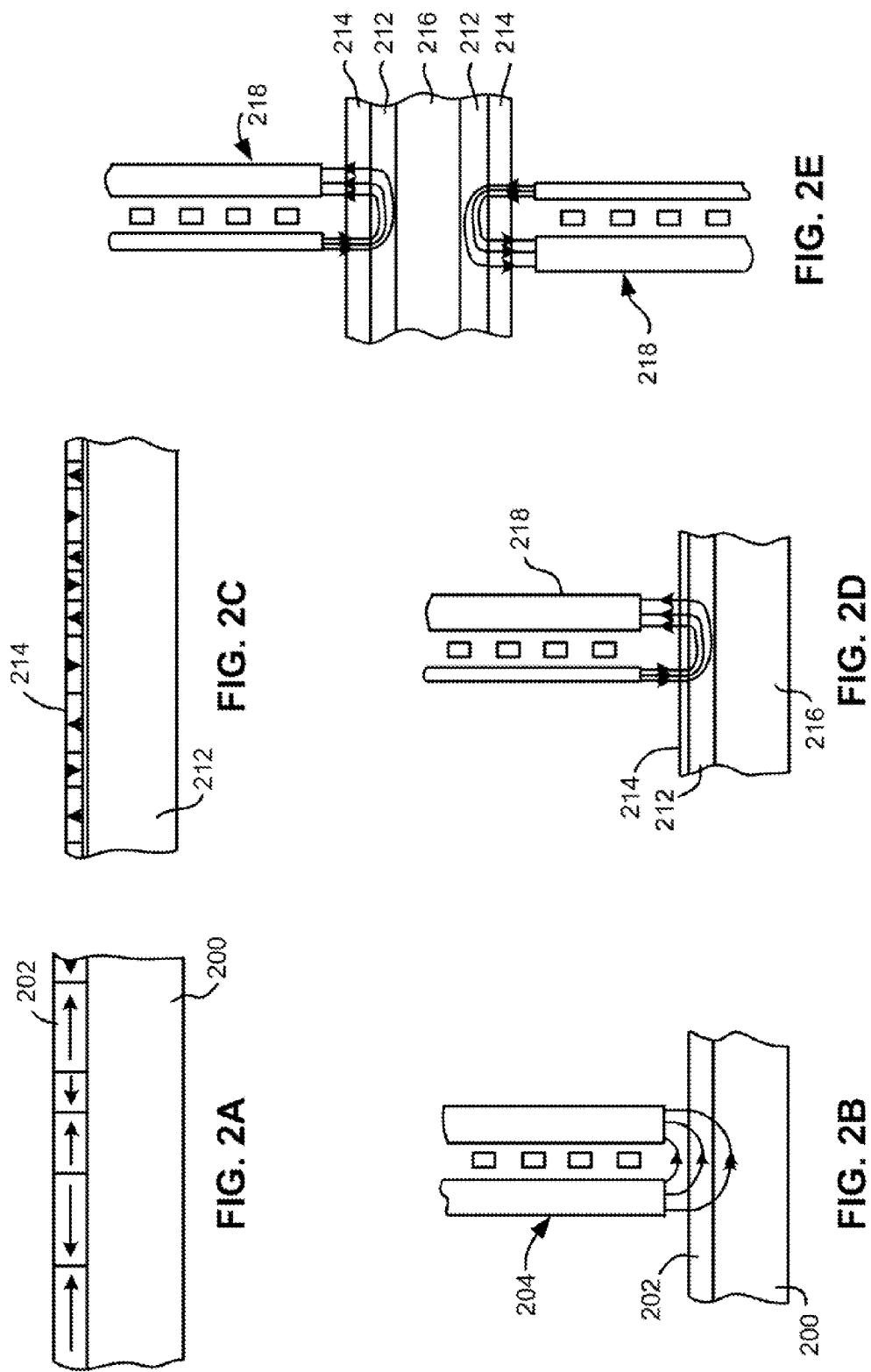

LOW PERMEABILITY MATERIAL FOR A SIDE SHIELD IN A PERPENDICULAR MAGNETIC HEAD

FIELD OF THE INVENTION

The present invention relates to a thin film perpendicular magnetic head having a side shield, and more particularly, this invention relates to a material used for the side shield that enhances the recording characteristics of the thin film perpendicular magnetic head.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

Structural improvements in terms of the magnetic head structure (flare length, trailing gap, trailing shield shape, etc.), development of high performance head materials having high saturation magnetic flux density and high magnetic permeability, etc., and magnetic head applications have been discovered in relation to magnetic field control. However, there is still a need for enhanced recording properties of materials in order to further reduce magnetic head size and improve performance characteristics.

SUMMARY

In one embodiment, a perpendicular magnetic head includes a main magnetic pole, a side shield disposed on both sides of the main magnetic pole in a track width direction, the side shield including a material having a saturation magnetic flux density of no greater than about 1.0 T, and a trailing shield disposed on a trailing side of the main magnetic pole, wherein the trailing shield and the side shield are physically separated from one another.

In another embodiment, a perpendicular magnetic head includes a main magnetic pole, a side shield disposed on both sides of the main magnetic pole in a track width direction, the side shield including a first magnetic film, and a trailing shield disposed on a trailing side of the main magnetic pole, the trailing shield including a second magnetic film, wherein a magnetic permeability of the first magnetic film is lower than a magnetic permeability of the second magnetic film.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a perpendicular magnetic head includes a main magnetic pole, a side shield disposed on both sides of the main magnetic pole in a track width direction, the side shield including a material having a saturation magnetic flux density of no greater than about 1.0 T, and a trailing shield disposed on a trailing side of the main magnetic pole, wherein the trailing shield and the side shield are physically separated from one another.

In another general embodiment, a perpendicular magnetic head includes a main magnetic pole, a side shield disposed on both sides of the main magnetic pole in a track width direction, the side shield including a first magnetic film, and a trailing shield disposed on a trailing side of the main magnetic pole, the trailing shield including a second magnetic film, wherein a magnetic permeability of the first magnetic film is lower than a magnetic permeability of the second magnetic film.

Figure 1:
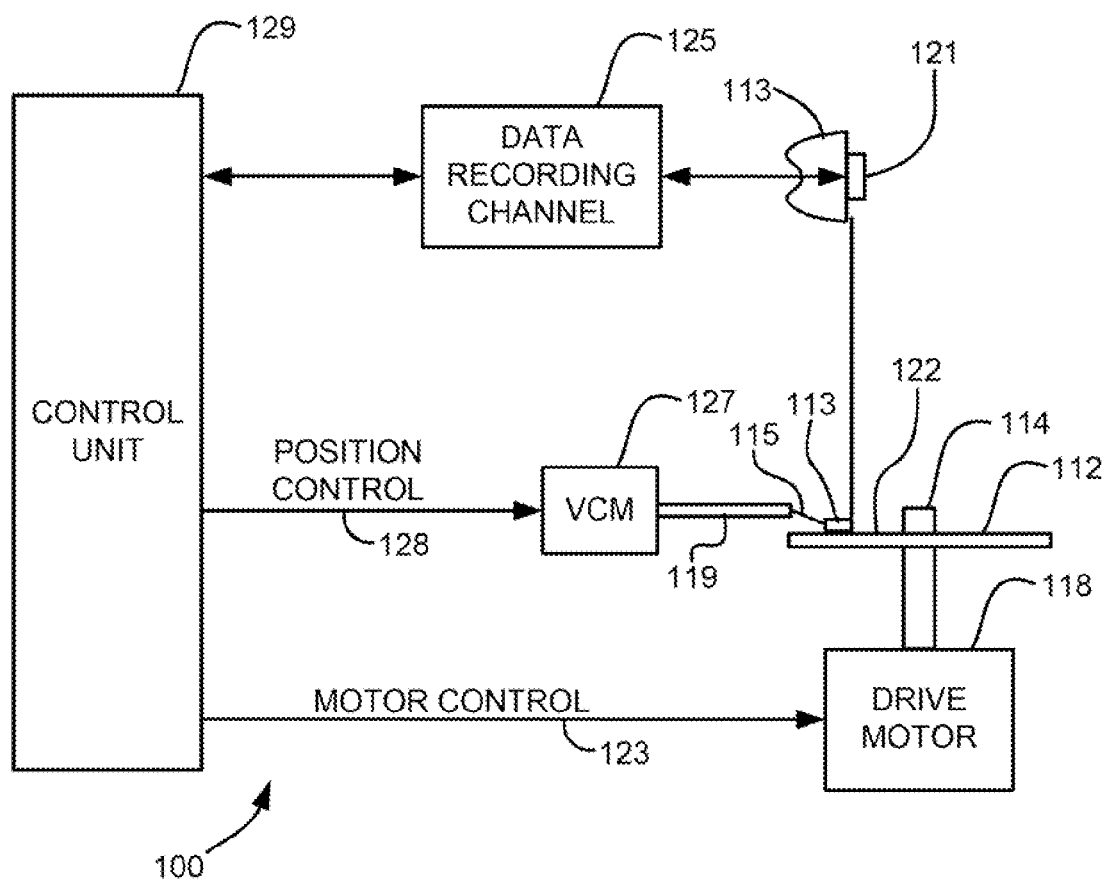
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

According to various embodiments, a magnetic data storage system comprises at least one magnetic head 121 according to any embodiment described herein, a magnetic disk medium 112, a drive mechanism 114, 118 for passing the magnetic disk medium 121 over the at least one magnetic head 121, and a controller 129 electrically coupled to the at least one magnetic head 121 for controlling operation of the at least one magnetic head 121.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
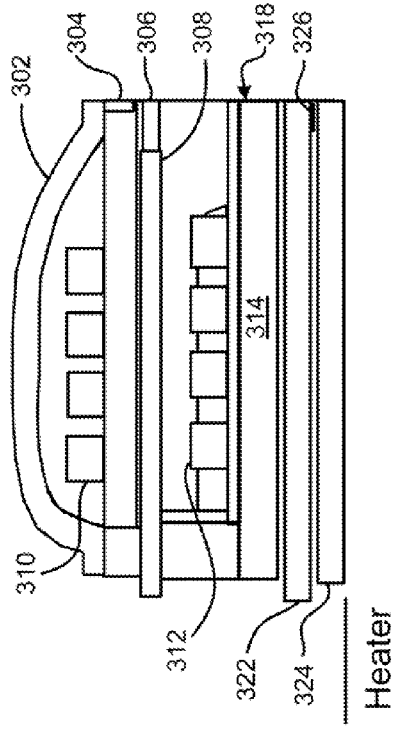
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
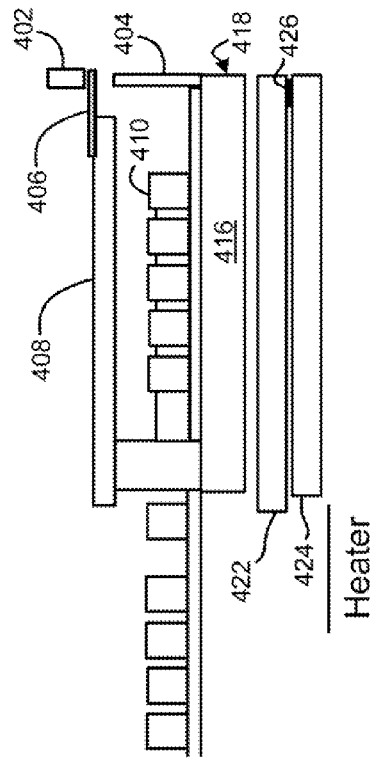
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
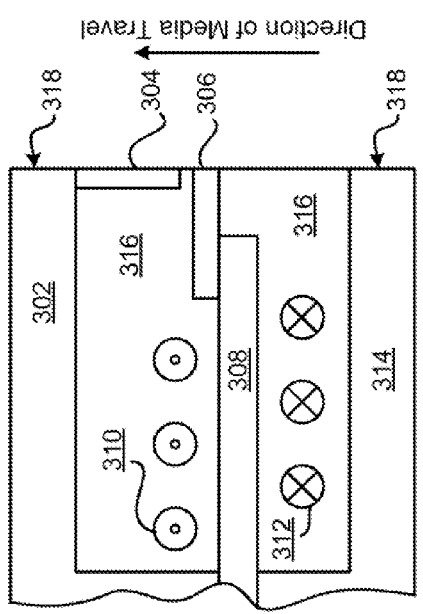
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
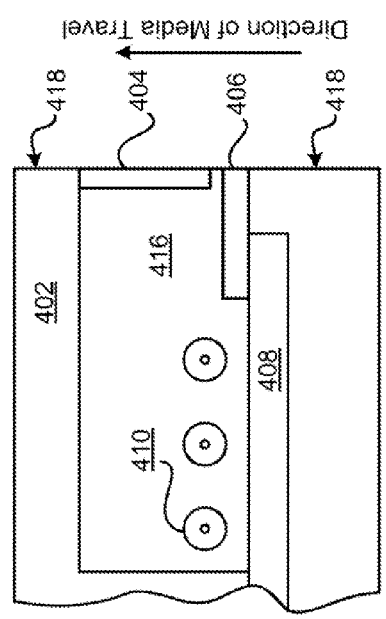
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

In some past attempts at improving a field gradient of magnetic heads, a method has been presented where a trailing gap width of the magnetic head is reduced, and a material having a high saturation magnetic flux density (Bs) is used for the trailing shield. However, the abovementioned method may cause deterioration in the field intensity, and therefore using this method may make it necessary to compensate for the field intensity by modifying the head structure in one of a plurality of ways.

According to one embodiment, in order to overcome the deficiencies of the conventional methods of improving the field gradient of the magnetic head, a technology for achieving an improvement in the field gradient and field intensity is provided by ensuring the suitability of the head materials, regardless of the head structure.

In one embodiment, a material having a saturation magnetic flux density of no greater than about 1.0 T is selected as a material for a side shield in a structure in which a trailing shield and the side shield are separated. Of course, other components of the magnetic head may also comprise the material having a saturation flux density of no greater than about 1.0 T, as would be understood by one of skill in the art upon reading the present descriptions (e.g., at least the side shield comprises the material having a saturation flux density of no greater than about 1.0 T).

In another embodiment, a nickel (Ni) alloy film having a composition in a range from Ni100 wt % to Ni84Fe16 wt % may be used as a material for the side shield. In some additional embodiments, another element and/or material may be added to the Ni alloy as would be understood by one of skill in the art upon reading the present descriptions.

In yet another embodiment, at least the side shield comprises a side shield material, in which the side shield material, when formed into a magnetic film having a thickness of no greater than about 1 has a magnetic permeability of no greater than about 1000. However, the side shield may be formed in thickness greater than or less than 1 μm while still proportionally retaining this characteristic.

According to one embodiment, when the side shield comprises a material having a high Ni composition, the high Ni composition is used so that a magnetic permeability in the same region is set to be lower than in a trailing shield of the magnetic head.

In yet another approach, a material having a high Ni composition is selected for the side shield material so that the saturation magnetic flux density in the same region is set to be lower than in a trailing shield of the magnetic head.

According to various embodiments, it is possible to generate a reverse magnetic charge in the trailing shield without any structural modifications, and this effect produces an increased recording field gradient (e.g., about a 10% increase), thereby providing a magnetic disk device in which the recording density is improved by about 10%.

Figure 5:
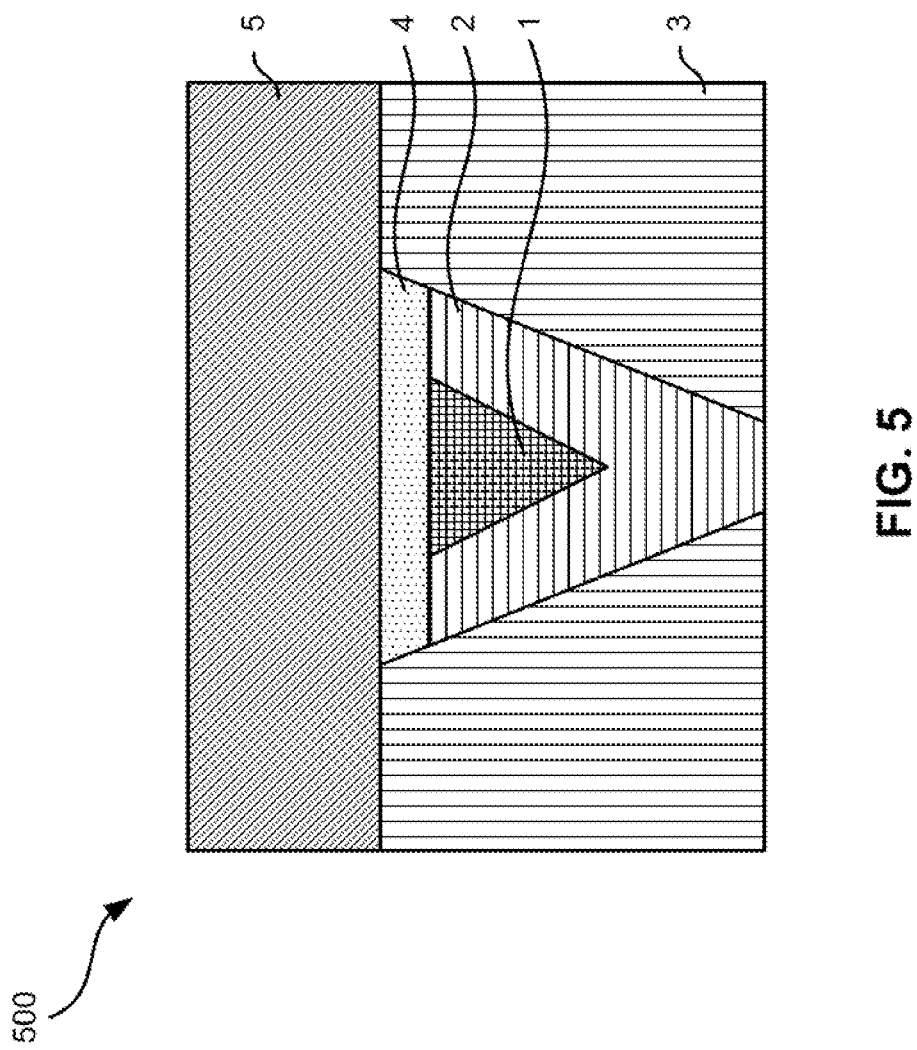
FIG. 5 is an air bearing surface (ABS) view of a perpendicular magnetic head, according to one embodiment.

Now referring to FIG. 5, an ABS view of a perpendicular magnetic head 500 is shown according to one embodiment. The perpendicular magnetic head 500 comprises: a main magnetic pole 1, a side gap layer 2 formed at a side of the main magnetic pole 1, a side shield layer 3 positioned at a side of the side gap layer, a trailing gap layer 4 formed at a top of the main magnetic pole 1, and a trailing shield layer 5 positioned further on top of the main magnetic pole 1.

The magnetic head 500 shown in FIG. 5 has a V-shaped configuration (the shape of the main magnetic pole 1 and gap layers 2, 4 around the main magnetic pole 1), but embodiments presented herein are no so limited. The magnetic head 500 may have any shape, configuration, or arrangement as would be understood by one of skill in the art upon reading the present descriptions.

With continued reference to FIG. 5, the side shield 3 is disposed on both sides of the main magnetic pole 1 in a track width direction, and the side shield 3 comprises a material having a saturation magnetic flux density of no greater than about 1.0 T. Also, the trailing shield 5 is disposed on a trailing side of the main magnetic pole 1, and the trailing shield and the side shield are physically separated from one another.

According to one approach, at least a portion of the side shield 3 may comprise a single layer or multilayer alloy film of nickel (Ni) in a range from Ni100 wt % to Ni84Fe16 wt %. An advantage of the multilayer film is discussed in more detail later. According to a further approach, the alloy film of nickel may comprise an element other than nickel (Ni) and iron (Fe), such as chromium (Cr), Molybdenum (Mo), and/or sulfur (S), among others.

According to another embodiment, the side shield 3 may comprise a side shield material that has a characteristic such that a magnetic film of the side shield material has a magnetic permeability of no greater than about 1000 when a thickness of the magnetic film is no greater than about 1 μm. However, the thickness of the side shield is not limited to less than about 1 μm, and may be thicker or thinner as determined by one of skill in the art upon reading the present descriptions. Of course, this characteristic may be proportionally maintained when the side shield is formed in thickness greater than or less than 1 μm.

In another embodiment, a side shield 3 may be disposed on both sides of the main magnetic pole 1 in a track width direction, the side shield 3 comprising a first magnetic film and a trailing shield 5 may be disposed on a trailing side of the main magnetic pole 1, the trailing shield 5 comprising a second magnetic film. A magnetic permeability of the first magnetic film may be lower than a magnetic permeability of the second magnetic film, in preferred embodiments. In this or any other embodiment, the trailing shield 5 and the side shield 1 may be physically separated from one another.

Figure 6A:
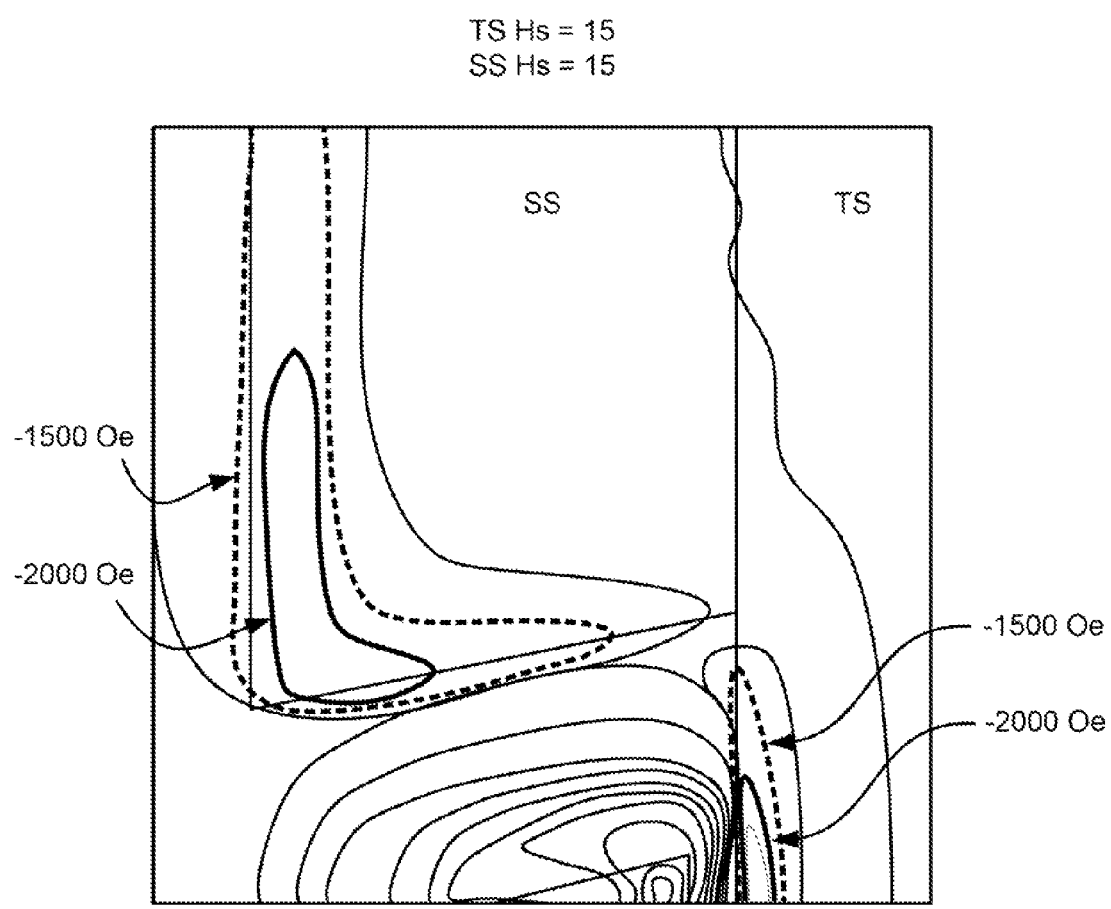
FIGS. 6A-6C show calculation results of an effective magnetic field when a saturation magnetic field of the side shield and a saturation magnetic field of the trailing shield are variously modified, according to one embodiment.
Figure 6B:
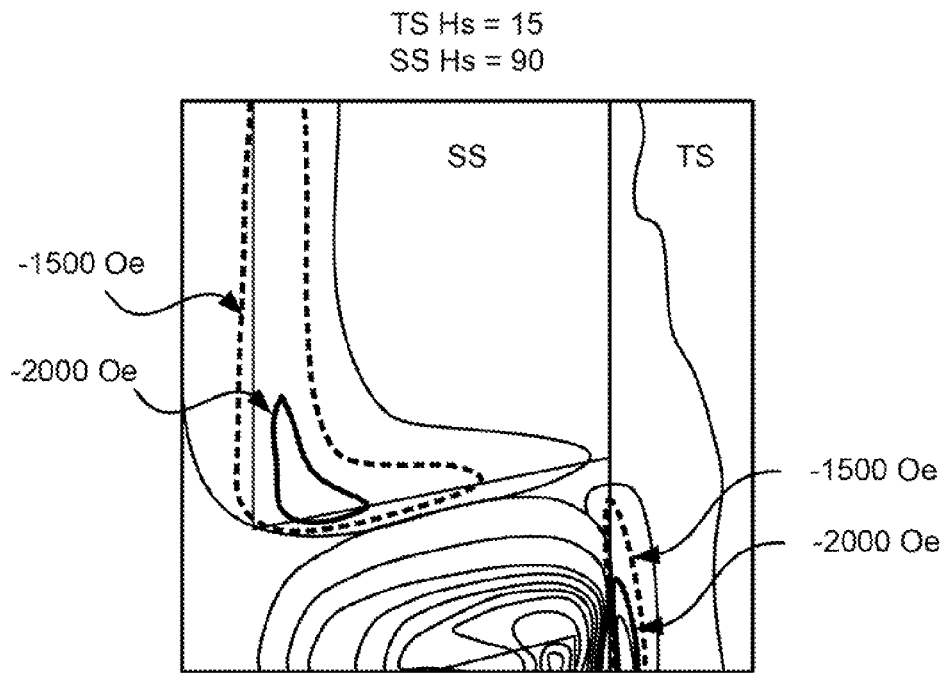
Figure 6C:
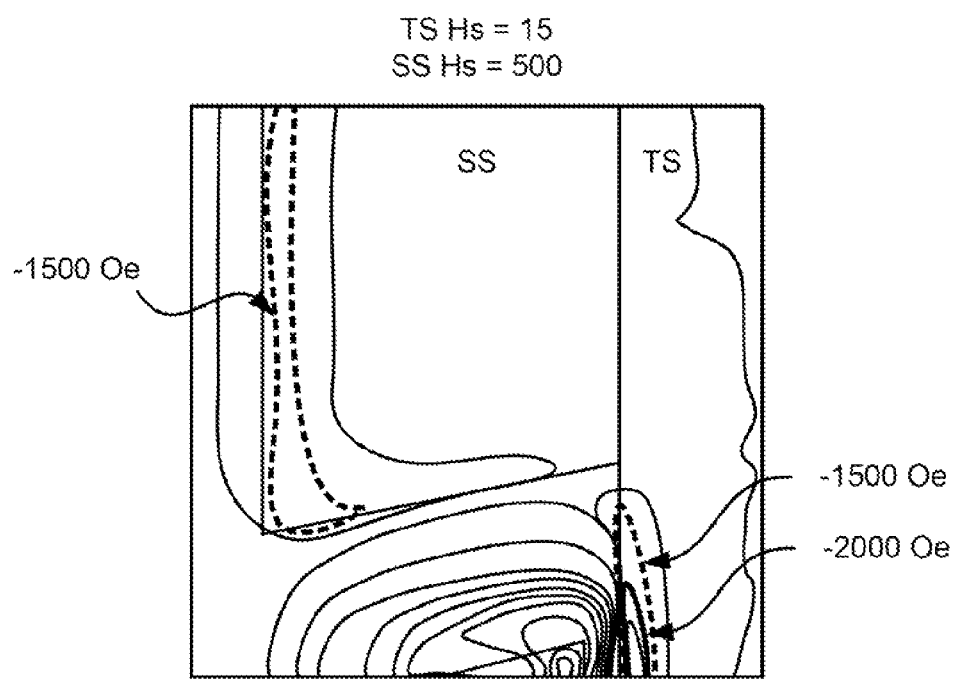
Figure 7:
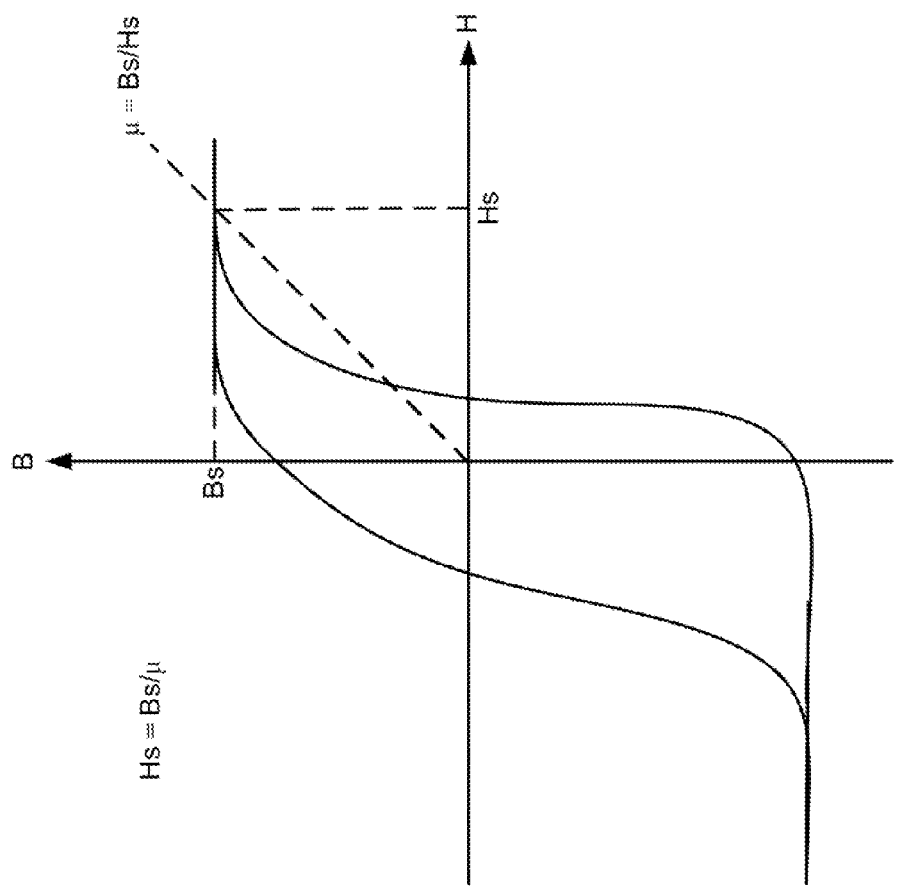
FIG. 7 shows calculation results of an effective magnetic field where $Hs=Bs/\mu$, according to one embodiment.

Referring to FIGS. 6A-6C, calculation results of an effective magnetic field (Heff) when a saturation magnetic field (Hs) of the side shield and a saturation magnetic field (Hs) of the trailing shield are variously modified. In FIGS. 6A-6C, the dotted line represents an equivalent value line where Heff=−1500 Oe and the solid line represents an equivalent value line where Heff=−2000 Oe. Furthermore, the saturation magnetic field (Hs) is determined by a magnetic permeability and a saturation magnetic flux density of the material used in the structure (in FIG. 7, Hs=Bs/μ). It can be seen from these results that as the Hs of the side shield becomes greater than the Hs of the trailing shield, the effective magnetic field of the side shield shifts to the positive side (the region of Heff=−1500, −2000 becomes narrower), and the effective magnetic field of the trailing shield shifts to the negative side (the region of Heff=−1500, −2000 extends further). It can be understood from this that a high field gradient can be achieved, without changing the structure of the head or the material of the main magnetic pole or trailing shield, by increasing the Hs of the side shield. This is believed to be an effect whereby the magnetic flux flowing in the side shield is limited by a high Hs (low magnetic permeability and low saturation magnetic flux density), and as a result the magnetic charge is concentrated on the trailing shield. The side shield is positioned at the side of the main magnetic pole and therefore a large amount of magnetic flux flows to the flare because of the positional relationship between the side shield and the flare. For this reason, the saturation magnetic flux density of the side shield is preferably lower than that of the trailing shield in order to obtain a high magnetic field. Furthermore, the side shield functions in a state of non-saturation, and therefore it is not possible to maintain the effective magnetic charge state at a low level simply by restricting the abovementioned low saturation magnetic flux density (if the magnetic permeability increases the magnetic charge increases, even with low saturation magnetic flux density).

Figure 8:
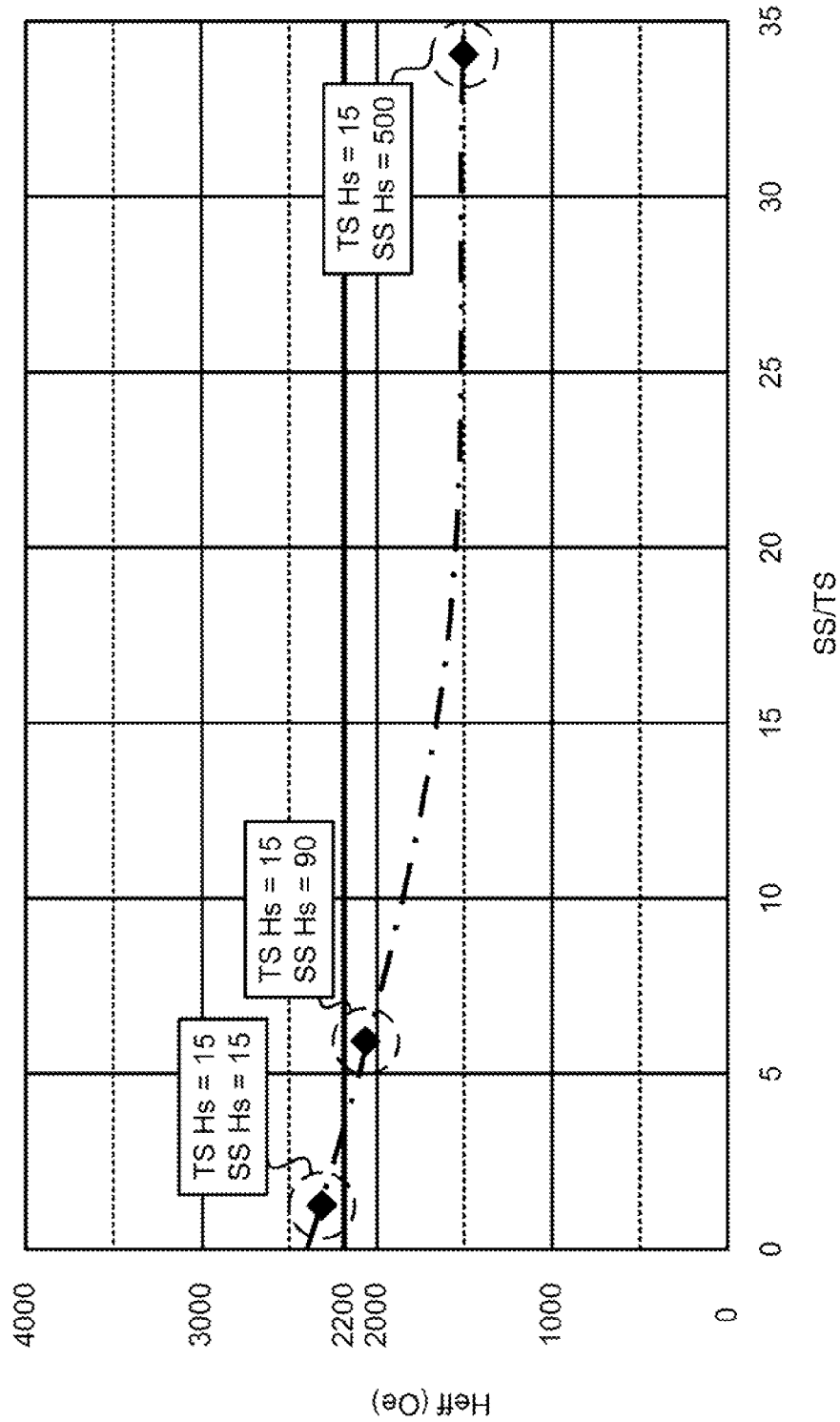
FIG. 8 shows a relationship of the Hs ratio and the minimum value of the effective magnetic field of the side shield, according to one embodiment.

To this end, a low saturation magnetic flux density together with a low magnetic permeability (e.g., high Hs) may be used for the side shield material. FIG. 8 shows a relationship of the Hs ratio and the minimum value of the effective magnetic field (Heft) of the side shield. When the nucleation field (Hn) is 2200 Oe or less, the quality of magnetic information does not generally drop, even if information is written to an adjacent track many times. In brief, it has been understood that the minimum value of Heff may be 2200 Oe or less, and this is obtained with an Hs ratio of 1:6 or greater.

Figure 9:
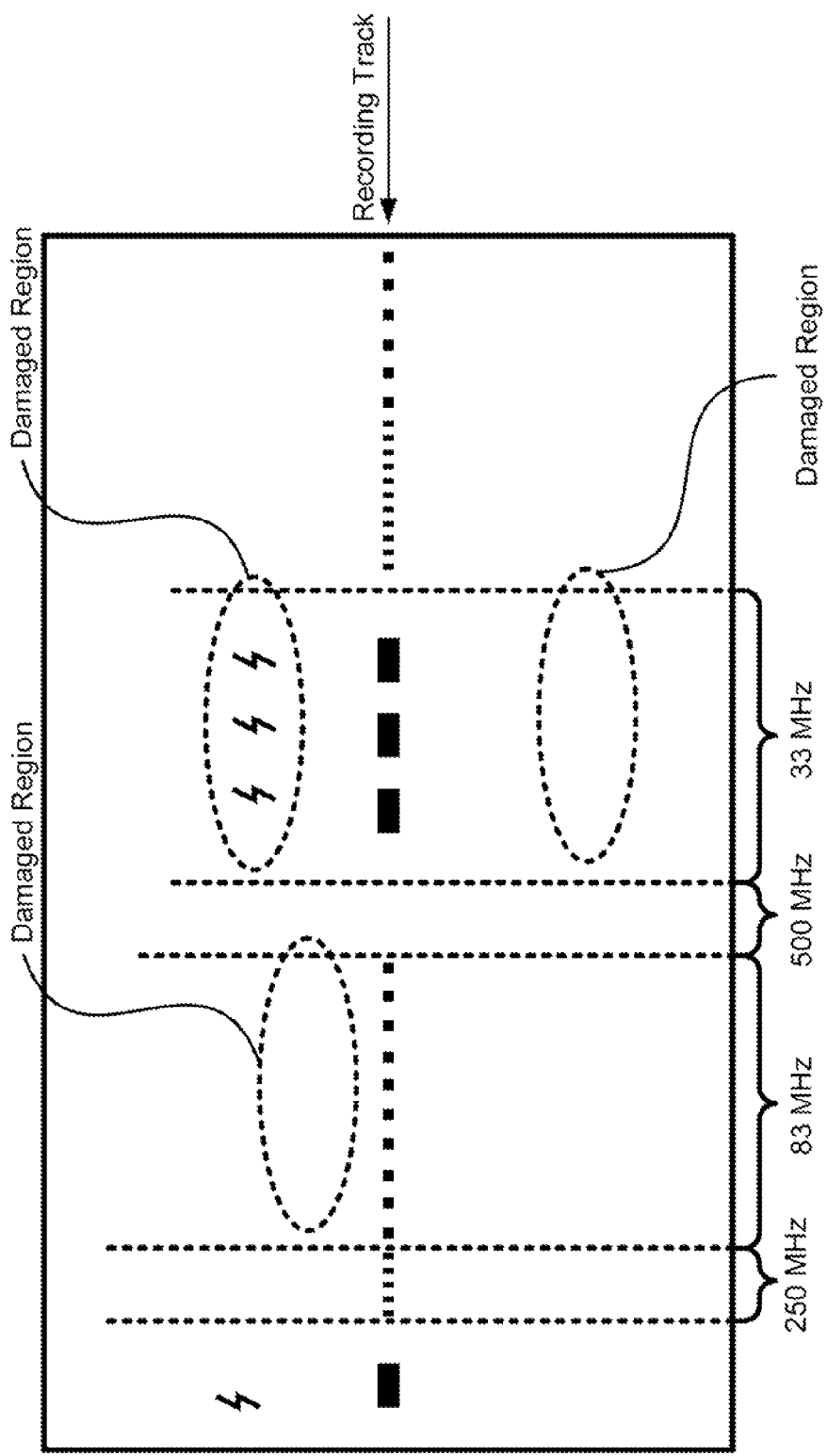
FIG. 9 shows results of spin-stand measurements of the leakage field from the side shield, according to one embodiment.
Figure 10:
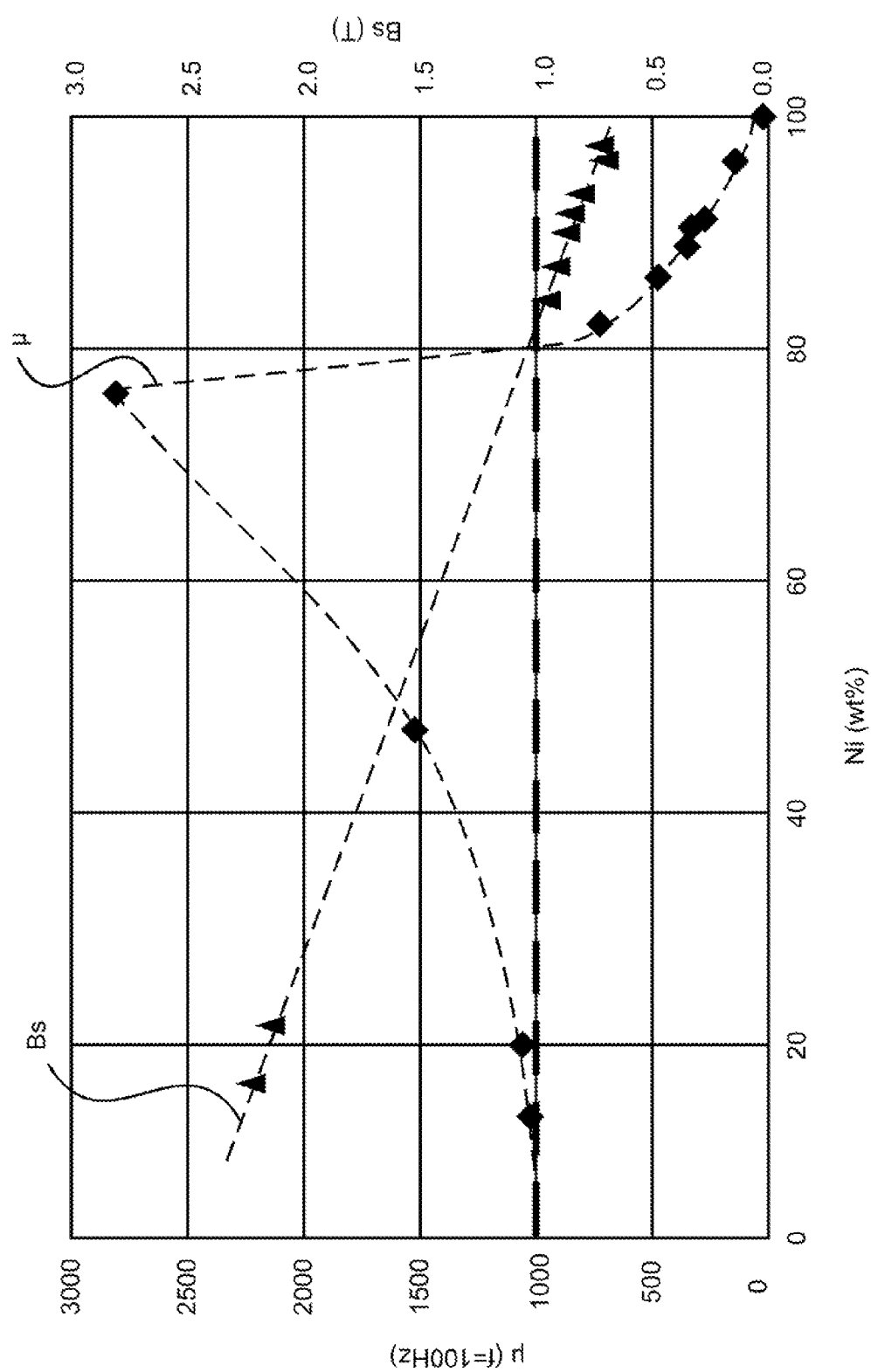
FIG. 10 shows the result of measurements of changes in the saturation magnetic flux density and magnetic permeability when there were changes in the compositional ratio of Ni, according to one embodiment.

In one approach, a side shield material that may achieve the above goal is described. FIG. 9 shows results of spin-stand measurements of the leakage field from the side shield. According to these results, the leakage field in the region of 100 MHz (FIG. 9 shows the results at 83 MHz), which is low frequency, has a greater effect than the leakage field at high frequency (250 MHz or greater). Accordingly, the magnetic permeability of the material was compared focusing on the low frequency of 100 MHz. The results are shown in FIG. 10. These are a result of measurements of changes in the saturation magnetic flux density and magnetic permeability when there were changes in the compositional ratio of Ni, which is a low saturation magnetic flux material, and Fe, which is a high saturation magnetic flux material.

In order to make the present invention possible, it is necessary to implement a clear difference (1:6) between the Hs of the trailing shield and the Hs of the side shield, and in view of this, the material composition obtained is in the range of Ni100 wt % to Ni84Fe16 wt %. One of skill in the art will readily understand that this effect is still demonstrated if the system includes a third element (e.g., Cr, Mo, S, etc.) or material. Furthermore, the benefits described herein may be realized if a multilayer film comprising a Ni and Fe alloy film is used rather than a single-layer film. If a multilayer film is used, the soft magnetic characteristics of each layer are easily maintained, and therefore this has the advantage that control of the function (Hs) of the side shield can be freely changed by controlling the thickness of each layer of the multilayer film.

The magnetic film used for the side shield according to one embodiment is a magnetic plating film comprising Ni or elemental Ni and Fe. The conditions and method for producing the plating film, and the magnetic characteristics are described here. The plating power source used was a constant-current power source. The applied magnetic field during plating was 1 kOe.

Figure 11A:
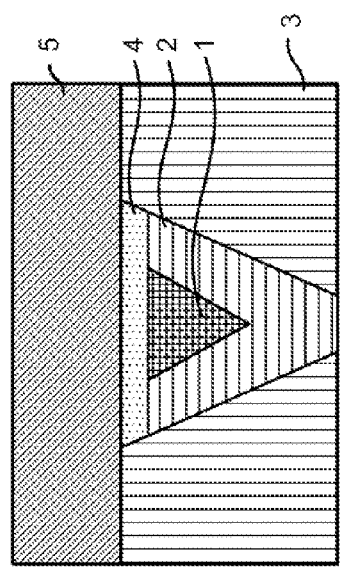
FIGS. 11A-11D show embodiments where the side shield comprises a single-layer film and embodiments where the side shield comprises a multilayer film.
Figure 11B:
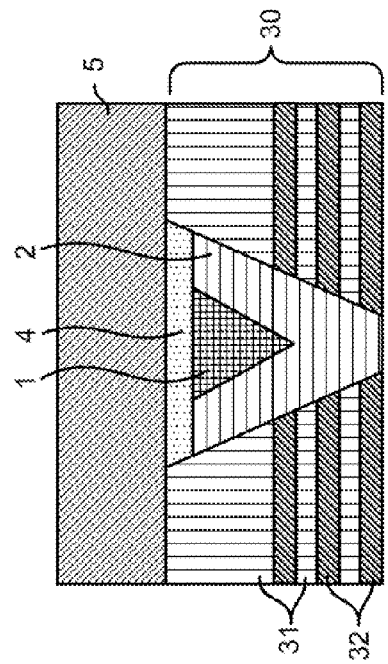
Figure 11C:
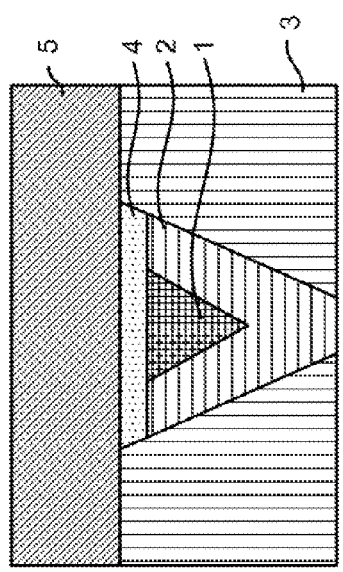
Figure 11D:
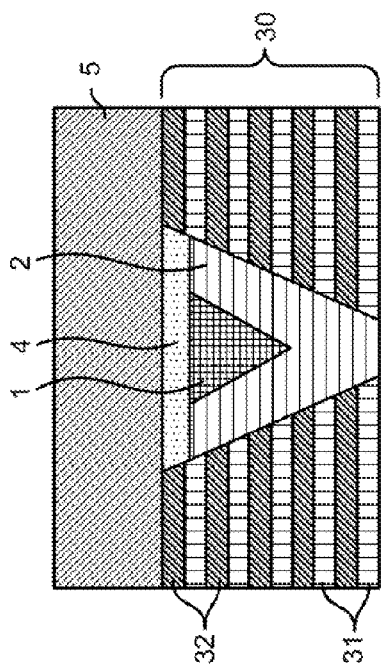

FIGS. 11A-11D show embodiments where the side shield 3 comprises a single-layer film (FIGS. 11A-11B), and embodiments where the side shield 30 comprises a multilayer film comprising layers 31 and 32 (FIGS. 11C-11D), with the remaining components being numbered the same as in FIG. 5. The plating bath disclosed in Table 1 was used to produce an Ni100 wt % plating film (as shown in FIG. 11A), and the plating bath disclosed in Table 2 was used to produce an Ni80Fe20 wt % plating film (as shown in FIG. 11B). NiXFe (100-X) wt % and NiYFe(100-Y) wt % were stacked when a 84≤Ni≤100 wt % plating film was produced (FIG. 11C). In this process, only part of the side shield may be a multilayer film (as shown in FIG. 11D), or all of the side shield (as shown in FIG. 11C). The range of X and Y is 84≤X≤100 and 84≤Y≤100, and X≠Y, in preferred embodiments. The film composition was controlled by varying the thickness of each film during stacking. Furthermore, the plating films contained at least 1 wt % of S, uniformly in the film thickness direction. For this purpose, a plating bath containing sodium saccharin was used. Furthermore, additives such as gloss agents may be added to the plating bath.

TABLE 1

| $Ni^{2+}/(Fe^{2+} + Ni^{2+})$ | About 0.90-0.99 |
|---|---|
| B(OH)3 | 25 ± 5 g/l |
| NaCl | 25 ± 5 g/l |
| Sodium Saccharin | 1.5 ± 1.0 g/l |
| pH | About 2-4 |

TABLE 2

| $Ni^{2+}/(Fe^{2+} + Ni^{2+})$ | 1 |
|---|---|
| B(OH)3 | 25 ± 5 g/l |
| NaCl | 25 ± 5 g/l |
| Sodium Saccharin | 1.5 ± 1.0 g/l |
| pH | About 2-4 |

Figure 12:
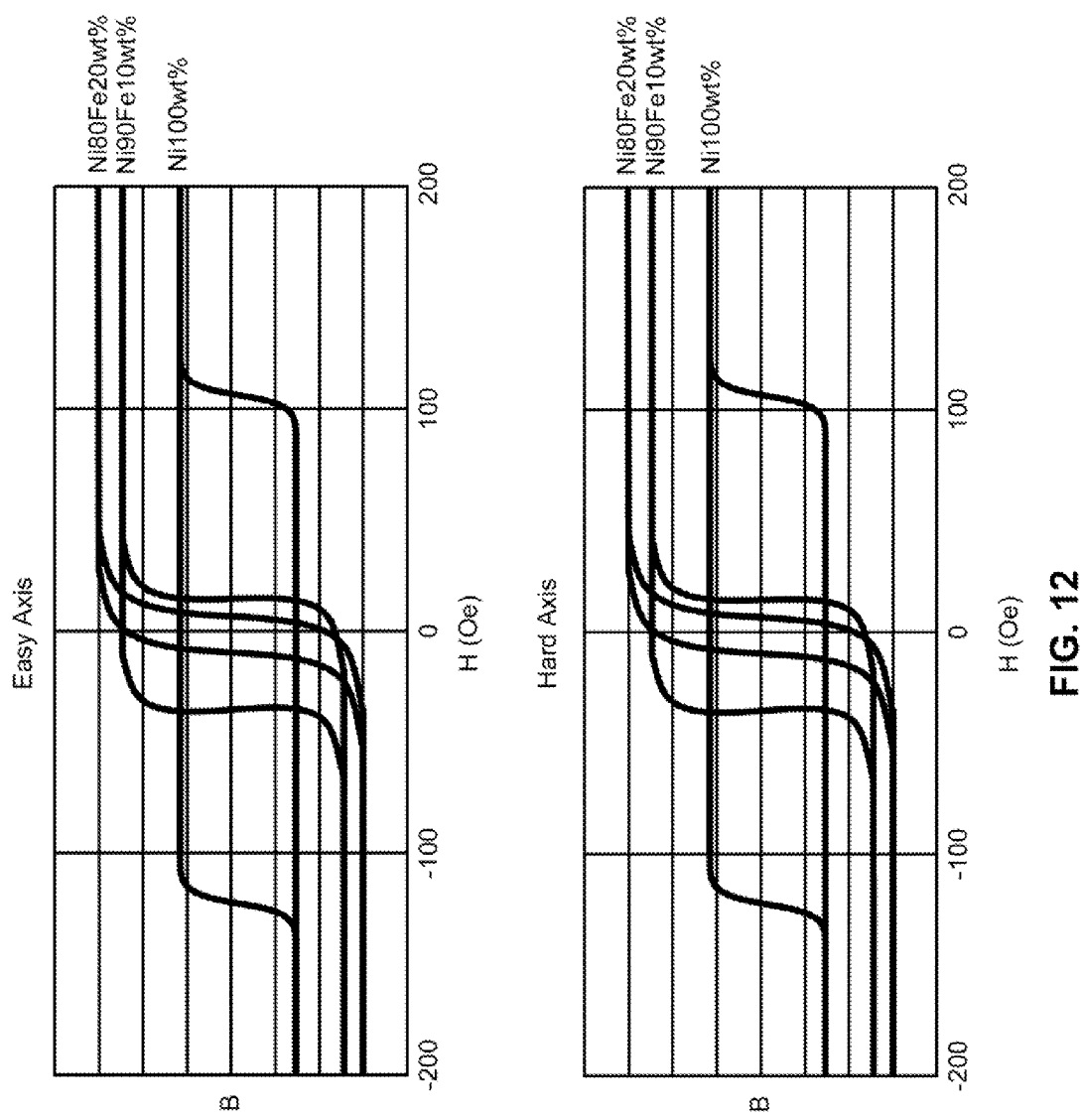
FIG. 12 shows B-H curves in the easy-axis direction and the hard-axis direction of plating films, according to one embodiment.

FIG. 12 shows B-H curves in the easy-axis direction and the hard-axis direction of the plating films produced in the plating baths shown in Tables 1 and 2. The thickness of each plating film was 300 nm, and the Ni90Fe10 wt % plating film was produced by stacking the following: Ni100 wt % (75 nm)/Ni80Fe20 wt % (150 nm)/Ni 100 wt % (75 nm)/substrate. The plating current density in the process was 4.5 mA/cm² in each case. Perpendicular anisotropy is conventionally produced in a range where the Ni weight ratio is increased to beyond Ni85Fe15 wt %, but in some embodiments, a film having this compositional range is produced by stacking films, and therefore perpendicular anisotropy is not produced even beyond the range of Ni85Fe15 wt %.

Figure 13:
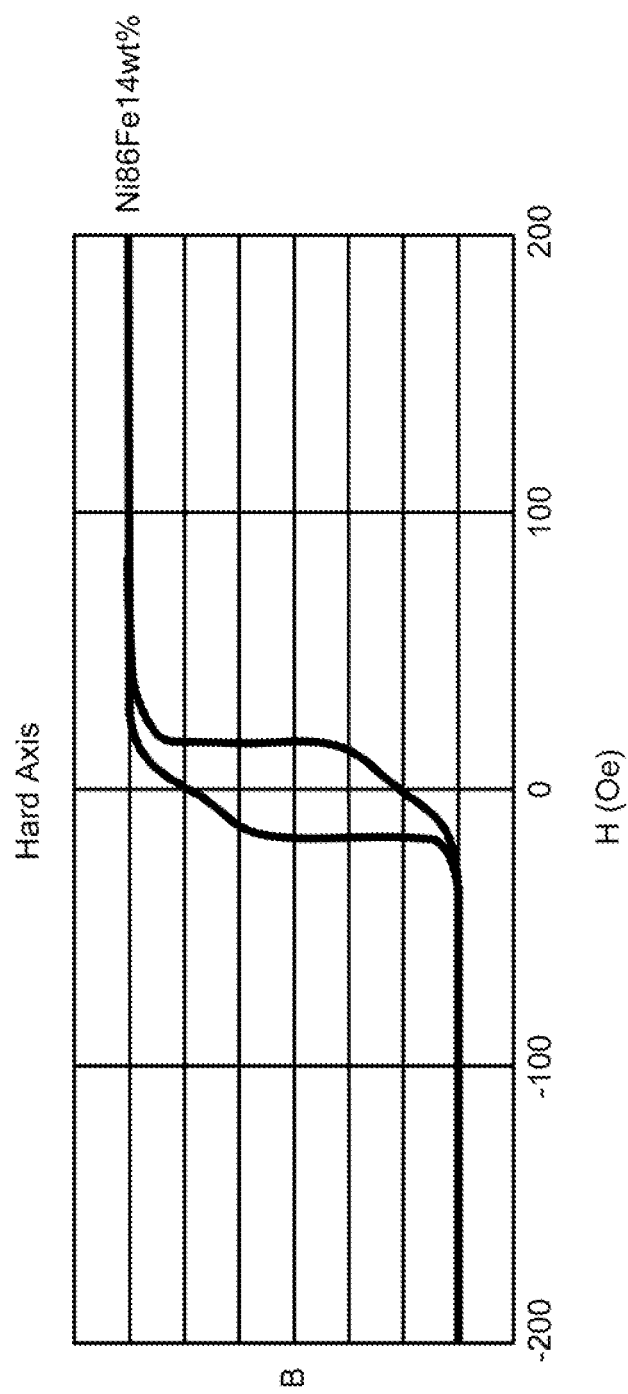
FIG. 13 shows a two-stage loop in B-H curves, according to one embodiment.

In this instance, perpendicular anisotropy is the property of having stability in the direction perpendicular to the film magnetization direction, and the B-H curve generally forms a two-stage loop (as shown in FIG. 13), and the effect as a side shield is considerably reduced when a film having perpendicular anisotropy is used for the side shield. The side shield is therefore produced as a multilayer film when the range goes beyond Ni85Fe15 wt % so that the film does not generate perpendicular anisotropy.

Figure 14:
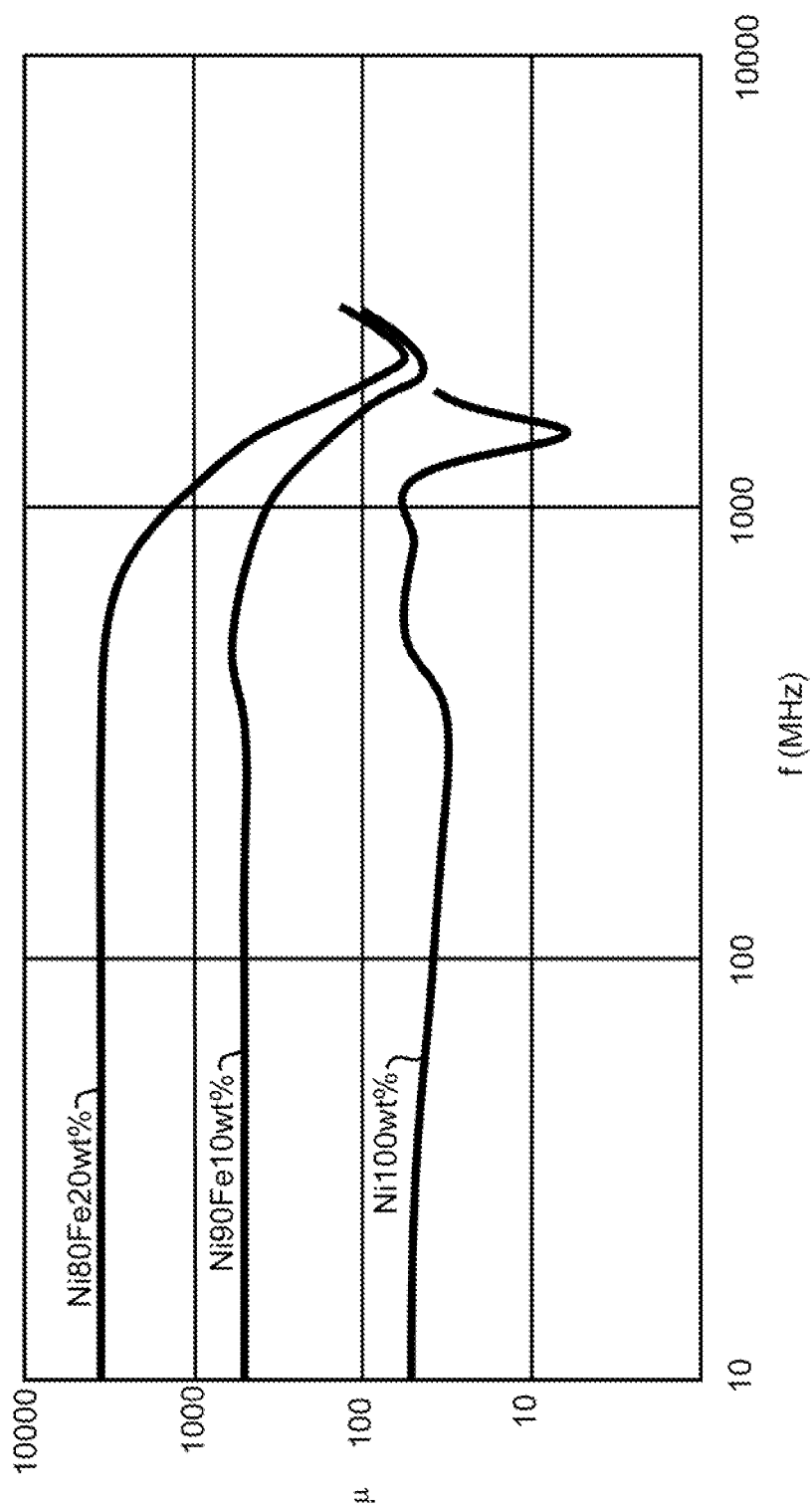
FIG. 14 shows a frequency dependency of the magnetic permeability of plating films, according to one embodiment.

FIG. 14 shows a frequency dependency of the magnetic permeability of the plating films using smooth curves. It is clear that the magnetic permeability of the plating films can be controlled by varying the Ni weight ratio in the plating films. The magnetic permeability was compared using a value in the region of frequency f=100 MHz. The required low-magnetic-permeability film according to one embodiment was obtained in the range from Ni84Fe16 wt % to Ni100 wt %.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic head, comprising:
   a main magnetic pole;
   a side shield disposed on both sides of the main magnetic pole in a track width direction, the side shield comprising a material having a saturation magnetic flux density of less than 1.0 T, wherein the material of the side shield comprises nickel (Ni) and iron (Fe); and
   a trailing shield disposed on a trailing side of the main magnetic pole,
   wherein the trailing shield and the side shield are physically separated from one another, and
   wherein the side shield does not generate perpendicular anisotropy.

2. The perpendicular magnetic head as recited in claim 1, wherein at least a portion of the side shield comprises a single layer or multilayer alloy film of nickel (Ni) in a range from Ni100 wt % to Ni84Fe16 wt %.

3. The perpendicular magnetic head as recited in claim 2, wherein the alloy film of nickel comprises an element other than nickel (Ni) and iron (Fe).

4. The perpendicular magnetic head as recited in claim 3, wherein the element other than nickel (Ni) and iron (Fe) comprises at least one of: chromium (Cr), molybdenum (Mo), and sulfur (S).

5. The perpendicular magnetic head as recited in claim 1, wherein the side shield comprises a side shield material, wherein each 1 µm thick section of a magnetic film of the side shield material has a magnetic permeability of no greater than about 1000.

6. A magnetic data storage system, comprising:
   at least one magnetic head as recited in claim 1;
   a magnetic disk medium;
   a drive mechanism for passing the magnetic disk medium over the at least one magnetic head; and
   a controller electrically coupled to the at least one magnetic head for controlling operation of the at least one magnetic head.

7. The perpendicular magnetic head as recited in claim 1, wherein the material of the side shield having the saturation magnetic flux density of less than 1.0 T is a first magnetic film,
   wherein the trailing shield comprises a second magnetic film, and
   wherein a magnetic permeability of the first magnetic film is lower than a magnetic permeability of the second magnetic film.

8. The perpendicular magnetic head as recited in claim 7, wherein the trailing shield and the side shield are physically separated from one another.

9. The perpendicular magnetic head as recited in claim 7, wherein at least a portion of the first magnetic film comprises a single layer or multilayer alloy film of nickel (Ni) in a range from Ni100 wt % to Ni84Fe16 wt %.

10. A magnetic data storage system, comprising:
at least one magnetic head as recited in claim 7;
a magnetic disk medium;
a drive mechanism for passing the magnetic disk medium over the at least one magnetic head; and
a controller electrically coupled to the at least one magnetic head for controlling operation of the at least one magnetic head.

11. The perpendicular magnetic head as recited in claim 1, wherein the side shield is in direct physical contact with the trailing shield except in a region above the main pole.

12. The perpendicular magnetic head as recited in claim 1, wherein the saturation magnetic flux density of the side shields is less than 0.9 T.

13. The perpendicular magnetic head as recited in claim 1, wherein the saturation magnetic flux density of the side shields is less than 0.8 T.

14. The perpendicular magnetic head as recited in claim 1, wherein the saturation magnetic flux density of the side shields is less than 0.7 T.

15. The perpendicular magnetic head as recited in claim 1, wherein the side shield comprises a single layer or multilayer alloy film, the side shield having a nickel (Ni) content in a range from Ni100 wt % to Ni90 wt %.

16. The perpendicular magnetic head as recited in claim 1, wherein the side shield is a multilayer film comprising Ni and Fe, where the Ni concentration in the entire side shield is greater than 87 wt % Ni.

17. The perpendicular magnetic head as recited in claim 1, wherein the side shield is a multilayer film comprising layers of Ni and layers of NiFe.

18. The perpendicular magnetic head as recited in claim 17, wherein the Ni concentration in the side shield is at least 90 wt % Ni.

19. The perpendicular magnetic head as recited in claim 17, wherein at least a portion of the side shield comprises a multilayer alloy film of nickel (Ni), iron (Fe), and at least one additional element, the at least one additional element being selected from a group consisting of: chromium (Cr), molybdenum (Mo), and sulfur (S), wherein a Ni concentration in the entire side shield is at least 84 wt % Ni, and wherein at least two layers of the multilayer alloy film have different concentrations of Ni.

20. The perpendicular magnetic head as recited in claim 1, wherein the side shield has a region of multiple layers and a region of a single layer, wherein the single layer is thicker than two adjacent ones of the multiple layers.

* * * * *

UNITED STATES PATENT AND TRADEMARK OFFICE
CERTIFICATE OF CORRECTION

PATENT NO. : 8,570,683 B2
APPLICATION NO. : 13/168083
DATED : October 29, 2013
INVENTOR(S) : Takahashi et al.

It is certified that error appears in the above-identified patent and that said Letters Patent is hereby corrected as shown below:

In the specification:

Col. 8, line 29 replace "(Heft)" with --(Heff)--.

Signed and Sealed this
Eleventh Day of February, 2014

Michelle K. Lee
*Deputy Director of the United States Patent and Trademark Office*